Figure 8:
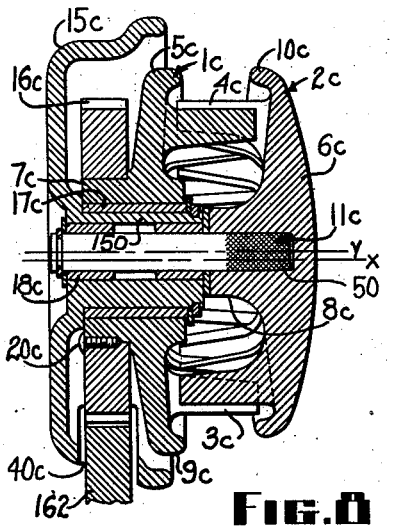

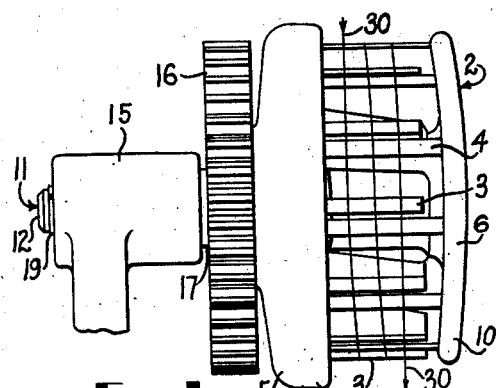
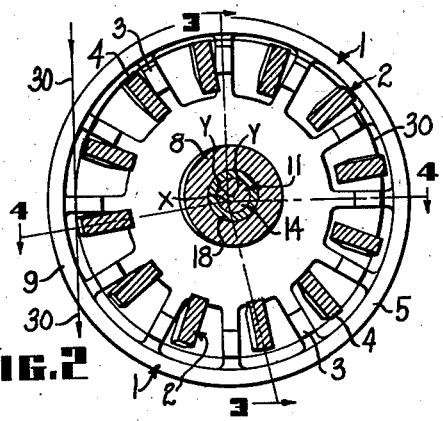
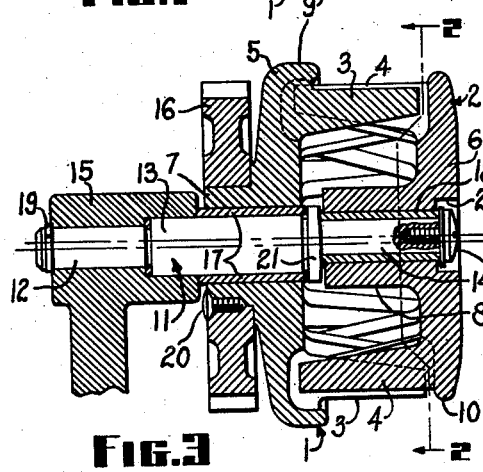
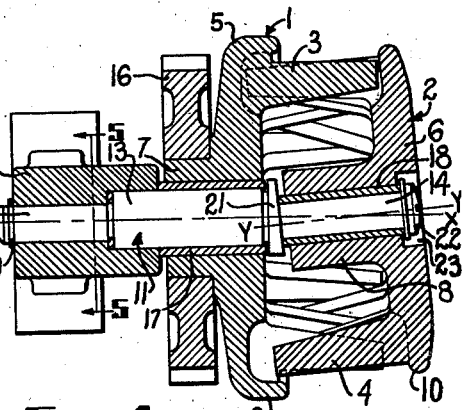
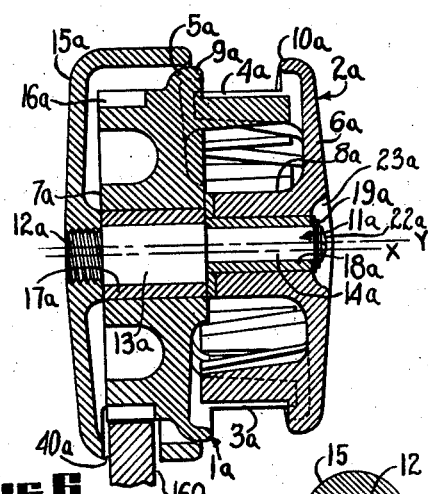
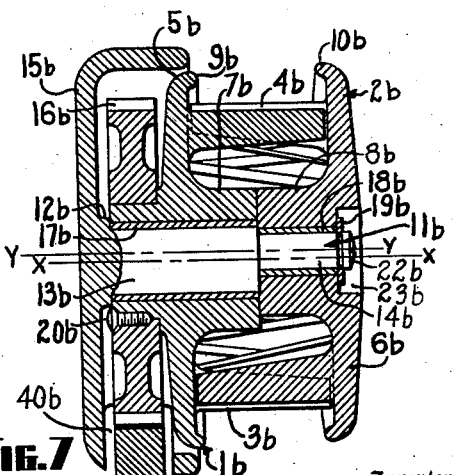

July 14, 1942. G. P. TORRENCE ET AL 2,289,390
WINDING REEL
Filed Dec. 12, 1940 2 Sheets-Sheet 2

Inventor
GEORGE P. TORRENCE
RICHARD F. BERGMANN

Attorney

Patented July 14, 1942

2,289,390

UNITED STATES PATENT OFFICE 2,289,390

WINDING REEL

George P. Torrence, Shaker Heights, and Richard F. Bergmann, Lakewood, Ohio, assignors to Industrial Rayon Corporation, Cleveland, Ohio, a corporation of Delaware Application December 12, 1940, Serial No. 369,840

14 Claims. (Cl. 242—53)

This invention relates to apparatus for manipulating bands, ribbons, tubes, filaments, thread or the like, hereinafter referred to as "thread."

More particularly, the invention is directed to a winding reel adapted to advance thread continuously in substantially helical turns. Reels of this type comprise cage-like reel members of substantially circular cross section, the periphery of each reel member being made up of circumferentially spaced, longitudinally extending bar members. Preferably, but not necessarily, the bar members of each reel member are disposed in alternation to the bar members of the other reel member, so that both reel members occupy substantially the same space.

In winding reels of the type with which the invention deals, the axes of rotation of the respective reel members are inclined to and, if desired, laterally displaced from each other. The reel members themselves are so mounted that, during rotation thereof, the thread turns wound about the reel are transferred alternately from the bar members which comprise the periphery of one reel member to the bar members which comprise the periphery of the other reel member. By virtue of the inclined relation of the aforementioned axes, the thread is positively advanced lengthwise of the reel in a plurality of substantially helical turns.

The structural characteristics of winding reels of this type are governed largely by the diameters of the reel members, which, in turn, are governed by the uses to which the reels are to be put. Since the spacing between thread turns is a function of the inclination of the axes of the reel members and since the number and length of the bar members limit the amount of inclination of the axes, axial compactness is particularly important in reels of small diameter; e. g., of the order of approximately three inches or less. Obviously, the machining operations involved in making the component parts of such small reels, while preferably of a high degree of accuracy, should be as simple as possible.

The present invention provides a winding reel of relatively small size, but the structural characteristics of the reel may be employed to advantage in reels of practically any diameter. Among other things, the invention employs novel means for supporting and driving the reels, in addition to which the construction of many of the other component parts of the reels is likewise novel. The invention permits increased compactness in such reels; however, many other advantages made possible by the invention will become apparent as the description of the invention proceeds.

Although the reels of the present invention may be employed to advantage in various forms of strand-handling machinery, they are particularly useful as "snubbing" devices in thread-doubling and twisting apparatus.

Figure 1 of the drawings represents a side elevation of a unitary winding reel of cantilever construction embodying the principles of the present invention. Figure 2 is a cross section of the same reel taken through line 2—2 of Figure 3, the latter being a sectional elevation of the reel as seen from line 3—3 of Figure 2. Figure 4 is a sectional plan of the reel through line 4—4 of Figure 2: while the lateral displacement of the axes is shown in Figures 2 and 3, the inclined relationship is shown in Figure 4. Figure 5 is a cross section of the reel support taken through line 5—5 of Figure 4.

Figure 10:
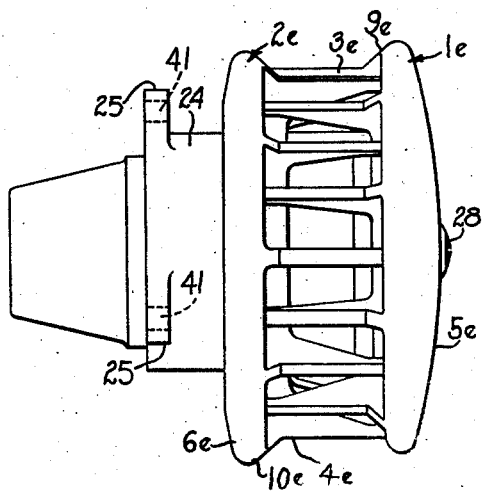
Figure 11:
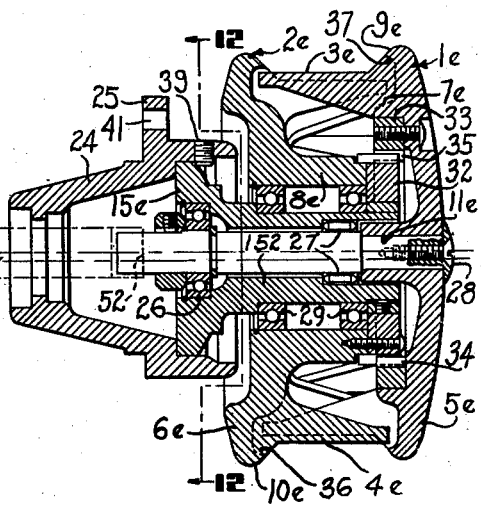
Figure 12:
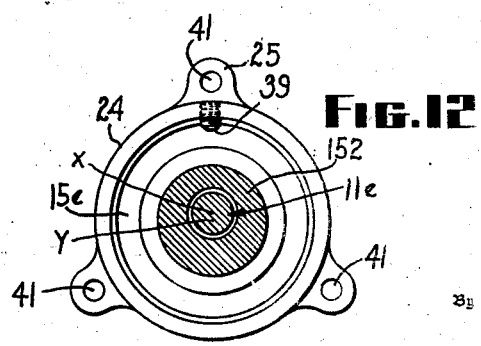

Figures 6 to 9, inclusive, are views of the nature of sectional elevations of four modified embodiments of the invention corresponding to the view of the preferred embodiment shown in Figure 3. Only lateral displacement of the axes of the reel members appears in Figures 6 to 9, inclusive, but the axes of the reel members are in each case inclined to each other as in the reel shown in Figures 1 to 4, inclusive. Figure 10 is a side elevation of still another reel embodying the features of the present invention; Figure 11 is a longitudinal sectional elevation of the reel of Figure 10; while Figure 12 is a cross section of a portion of the supporting means for the reel shown in Figures 10 and 11, more particularly as seen from line 12—12 of Figure 11.

By referring to Figures 1 to 4, inclusive, it may be seen that the reel which constitutes the preferred embodiment of the invention is of cantilever construction in that it is supported from one end only thereof, the unsupported end being free of obstructions such as supporting means, gears, shafts, etc. It is made up of rigid reel members 1 and 2, both of substantially circular cross section. Reel member 1 has a thread-bearing periphery formed of circumferentially spaced, longitudinally extending bar members 3 which project from disc 5 in a direction substantially parallel to hub portion 7 thereof. Reel member 2, on the other hand, has a thread-bearing periphery made up of circumferentially spaced, longitudinally extending bar members 4 which extend from disc 6 in a direction substantially parallel to hub portion 8 thereof.

In order to prevent advance of the thread beyond the thread-bearing portion of the periphery of the reel, reel member 2 is provided with a guard 10 at the periphery of disc 6 which guard prevents the thread from discharging over the end of the reel. Inasmuch as it prevents the turns of thread from rolling off the discharge end of the reel when the reel stops rotating, guard 10 is a particularly desirable adjunct when such reels are employed in doubling and twisting apparatus. At the same time there is provided on reel member 1, at the periphery of disc 5, a similar guard 9 which extends forward beyond the rearmost limits of the bar members 4 of reel member 2 in order to prevent the thread from passing beyond the thread-bearing portion of the reel at the supported end thereof.

Reel members 1 and 2 are so disposed that they occupy substantially the same space, the bar members thereof being alternately disposed while extending in opposite directions. Each of the reel members is mounted for rotation about its own axis; however, the axes of the two reel members are preferably, but not necessarily, in what is termed "skew" relationship. That is to say, they are inclined to each other in laterally offset relationship in a manner which causes thread wound about the reel members to be positively advanced lengthwise as explained in detail in Knebusch Patent No. 2,210,914. In the reels illustrated in the drawings, line $x$—$x$ represents the axis of rotation of reel member 1; line $y$—$y$, the axis of rotation of reel member 2.

As shown in Figures 3 and 4, the preferred embodiment of the invention employs a stationary shaft-like axle designated generally as 11 made up of a supporting segment 12, a first reel-carrying segment 13, and a second reel-carrying segment 14, which segments 13 and 14 support reel members 1 and 2, respectively. Segment 12, while for ease of assembly is of smaller diameter than segment 13, is concentric therewith. It is employed to support the reel as a whole, being rigidly held in mounting bracket 15. It is provided as shown in Figure 5 with a flat portion adapted to engage a corresponding flat portion in mounting bracket 15 to prevent rotation of axle 11.

If desired, a slip clutch of the kind shown in Torrence et al. Patent No. 2,217,717 may be provided between axle 11 and bracket 15, whereby axle 11 will rotate with the reel members when the torque on axle 11 exceeds a given amount. In such a case, the reel supported by axle 11 will cease to function as a thread-advancing device, acting instead as a pulley about which the thread will pass in a fixed path. Such arrangement may be desirable if, as sometimes occurs, breakage and consequent accumulation of the thread at the discharge end of the reel cause the reel to become bound.

Segment 14 is likewise somewhat smaller in diameter than segment 13. It is so formed that the axis about which reel member 2 rotates is inclined to and offset laterally from the axis about which reel member 1 rotates; viz., the axis of segment 13. Inasmuch as axle 11 is preferably formed of a single piece of material, segments 12, 13 and 14 thereof may be machined to provide the desired relationship between segments 12 and 13 and segments 13 and 14.

Reel member 1, which may be termed the positively driven member, has mounted directly thereon between disc 5 and mounting bracket 15 a driving gear 16 demountably secured to hub portion 7 of reel member 1 by means of set screw 20. Reel member 2, which may be termed the impositively driven member, is caused to rotate about its axis by virtue of contact of at least one of the bar members 3 of reel member 1 with at least one of the bar members 4 of the reel member 2. The reel will of course be driven by gear 16 in such manner as to advance the thread 30 from left to right as seen in Figures 1, 3 and 4.

A bushing 17, which may be mounted by a press fit on hub portion 7 of disc 5, provides a bearing surface for positively driven reel member 1 during its rotation about segment 13 of axle 11. Similarly, a bushing 18 mounted by a press fit on hub portion 8 of disc 6, provides a bearing surface for impositively driven reel member 2 during its rotation about segment 14 of axle 11. Such bushings may be of any desired kind, but are preferably of the oil-impregnated brass type.

The parts of the reel are held together in assembled relation by means of a snap ring 19 associated with segment 12 of axle 11, the snap ring bearing against the rear portion of supporting bracket 15. Segment 13 of axle 11, being of larger diameter than segment 12, abuts a shoulder in supporting bracket 15 on the side opposite snap ring 19, whereby axle 11 is located endwise in bracket 15. A washer is provided between segment 13 and the shoulder of bracket 15 against which it abuts. Bushing 17 abuts the outside of supporting bracket 15, so that reel member 1 is prevented from moving rearward on axle 11 beyond the portion of segment 13 which serves to support it.

Bushing 18, associated with hub portion 8 of reel member 2, abuts the face of a collar 21 on axle 11 between segments 13 and 14. Collar 21 prevents forward movement of reel member 1 on axle 11 and also prevents rearward movement of reel member 2, since bushing 17 abuts collar 21 on the opposite face thereof. Moreover, forward movement of reel member 2 and bushing 18 on supporting segment 14 of axle 11 is prevented by means of a cap screw 22 threaded into the end of segment 14 of axle 11. Preferably disc 6 has formed therein a countersunk recess 23 in which cap screw 22 is seated.

Figure 6 represents a similar reel comprising a positively driven reel member 1a and an impositively driven reel member 2a, said reel members being rotatable about axes in skew relation. Each reel member is provided with bar members, respectively designated 3a and 4a. Disc 5a and hub portion 7a of reel member 1a embody a gear member 16a formed integrally therewith. From gear 160, which is driven from a suitable power source, rotational movement is transmitted through gear member 16a to reel member 2a, as by contact of one or more bar members 3a of reel member 1a with one or more bar members 4a of reel member 2a.

Guard 9a of reel member 1a, which, as shown in Figure 6 of the drawings, takes the form of an integral flange, extends radially beyond the thread-bearing periphery of the reel, as does also guard 10a of reel member 2a. At the same time, the latter projects toward the supported end of the reel as a whole beyond the limits of bar members 3a of reel member 1a, thus forming a recess in which are received the ends of bar members 3a. A similar recess is provided in reel member 1a for receiving the ends of bar members 4a of reel member 2a.

Axle 11a of the reel of Figure 6 has supporting segment 12a thereof threaded in suitable fashion into supporting bracket 15a which, in turn serves as a shield for gear member 16a. A slot 40a, formed in bracket 15a, accommodates gear 160 which meshes with gear member 16a as hereinbefore described. Bracket 15a, which is shown as cup-shaped, may be mounted on a suitable supporting structure by supporting rods, clamps, set screws or other convenient means.

Inasmuch as axle 11a is securely mounted toward the rear of the reel in supporting bracket 15a, nothing more is required to hold the reel members in assembled relationship than a snap ring 19a on segment 14a. Stud 22a is threaded into segment 14a to further assist in maintaining the assembled relationship. In order that the discharge end of the reel may be free of obstructions, stud 22a is located within recess 23a in disc 6a.

Bushings 17a and 18a support reel members 1a and 2a, respectively, during rotation about their respective axes $x$ and $y$ upon segments 13a and 14a as shown in Figure 6.

Figure 7 represents a generally similar reel in which a separate, demountable spur gear 16b is mounted on hub portion 7b of reel member 1b, to which it is held by set screw 20b. Rotational movement is transmitted to the reel from gear 161. Supporting bracket 15b resembles supporting bracket 15a of the reel of Figure 6: for instance, slot 40b in bracket 15b accommodates gear 161. However, the construction differs in that axle 11b is formed integrally with bracket 15b; wherefore segment 12b, which in this case is of a diameter slightly greater than that of segment 13b, also forms a part of supporting bracket 15b. Other features of this reel, generally speaking, are similar to those of the reel shown in Figure 6.

The reel illustrated in Figure 8 differs somewhat in construction from the reels shown in Figures 1 to 7, inclusive. The relationship of the positively driven and impositively driven reel members is the same, but axle 11c is not stationary nor is it made up of a plurality of segments. Axle 11c is rigidly mounted, during construction of the reel, in disc 6c of reel member 2c, knurled portion 50 serving to bind the shaft to the reel member in such relation that there can be no relative rotation therebetween. Consequently, axle 11c rotates when reel member 2c rotates. Such rotation is transmitted through gear 16c from a suitable power source associated with gear 162 to reel member 1c. By contact of bar members 3c of reel member 1c with bar members 4c of reel member 2c, both reel members rotate at the same angular speed.

Supporting bracket 15c in this embodiment of the invention has a hollow boss 150 formed integrally therewith in such a manner that the inner surface of hollow boss 150 carries axle 11c. The outer surface of hollow boss 150 is so formed as to permit reel member 1c to rotate on bushing 17c about an axis in skew relationship to the axis of rotation of axle 11c. Bushing 18c is disposed between shaft 11c and the inner surface of hollow boss 150. Bracket 15c is similar to brackets 15a and 15b; slot 40c, for example, accommodates gear 162 which meshes with gear 16c, as already described.

Figure 9:
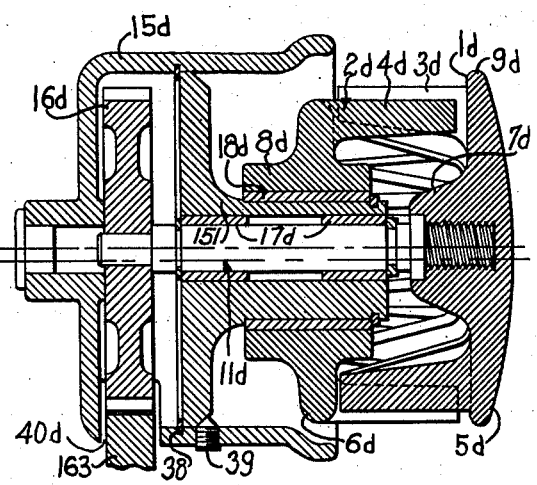

A reel of a slightly different type is shown in Figure 9. It is characterized by the fact that shaft 11d is rotated positively, through gear 16d mounted thereon, from a gear 163 which is driven from a suitable power source. Since reel member 1d is rigidly mounted on the unsupported end of shaft 11d, the bar members 3d thereof are directed toward the supported end of the reel. Bar members 3d intermesh with bar members 4d of reel member 2d. During rotation of the reel, one or more bar members 3d contact one or more bar members 4d to cause reel member 2d to rotate upon bearing 18d about boss 151, which is, in effect, a part of supporting bracket 15d although it is demountably attached thereto.

Boss 151 is urged against retainer ring 38 and held in place by set screw 39 threaded into supporting bracket 15d, which bracket in turn may be mounted on a supporting structure in much the same manner as brackets 15a, 15b or 15c. Supporting bracket 15d may be mounted on the supporting structure in such a way that gear 16d will be shielded from possible entanglement of thread therewith. Moreover, bracket 15d is provided with a slot 40d through which gear 163 passes in meshing with gear 16d. Preferably, supporting bracket 15d extends over the supported end of the reel far enough to prevent thread passing thereto from becoming entangled in the reel.

Reel member 1d is provided with a guard 9d, formed integrally with disc 5d; i. e., at the supported end of reel member 1d, so as to prevent discharge of thread over the end of the reel.

The reel illustrated in Figures 10, 11 and 12 is capable of advancing extremely heavy materials, including heavy rope, wire, cable, tubing, strip material, etc. The means for supporting the reel takes the form of bracket 24, provided with lugs 25 such that the unit may be inserted in a gear box or other housing. The bracket may be secured to such housing by passing bolts through bolt holes 41 in lugs 25. Removably mounted in bracket 24 is a supporting member 15e which has formed integrally therewith a boss 152 which also serves as a support for the reel. The supporting member 15e is held in place in bracket 24 by a set screw 39.

A driving stub 51 (shown in dotted lines) engages axle 11e in the recess 52 formed in the supported end thereof. During rotation of the reel axle 11e is carried by anti-friction bearings 26 in supporting member 15e and by bearings 27 in boss 152. At the unsupported end thereof, axle 11e carries positively driven reel member 1e, which is held in place by a set screw 28 threaded into the unsupported end of axle 11e. The impositively driven reel member 2e rotates about boss 152 in offset and inclined relation to reel member 1e, being carried by anti-friction bearings 29.

Reel members 1e and 2e are provided with guards 9e and 10e, respectively, on discs 5e and 6e to prevent passage of the thread beyond the thread-bearing portion of the periphery of the reel. As in Figures 6 to 8, inclusive, the unsupported ends of bar members 3e of reel member 1e extend into recesses 36 in disc 6e, while the unsupported ends of bar members 4e of reel member 2e extend into recesses 37 in disc 5e, thus precluding the possibility of entanglement of the thread in the interior of the reel members.

At the unsupported end of the reel are provided means for preventing bar-to-bar contact of reel members 1e and 2e. Such means comprise a spur gear 32 suitably mounted on and attached to reel member 2e and an internally toothed annular gear 33 suitably mounted on and attached to reel member 1e. During rotation of reel member 1e by axle 11e, teeth 35 of internal gear 33 mesh with the teeth 34 of spur gear 32 and thereby effect rotation of reel member 2e about its axis.

It is intended that the patent shall cover, by suitable expression in the appended claims, whatever features of patentable novelty reside in the invention.

What is claimed is:

1. A winding reel comprising two rigid reel members of generally circular cross section which occupy substantially the same space but which are nevertheless adapted to rotate about axes in inclined relation to each other, said reel members cooperating to advance thread or the like lengthwise of the reel in substantially helical turns, and, in combination therewith, a normally stationary reel-supporting axle upon the surface of which said reel members rotate about mutually inclined axes.

2. A winding reel of the character described in claim 1 wherein one of said reel members has associated therewith means through which rotary movement may be imparted to said reel members.

3. A winding reel of the character described in claim 1 wherein one of said reel members has formed integrally therewith gear-like means through which rotary movement may be imparted to said reel members.

4. A winding reel of the character described in claim 1 wherein said reel members are provided with projections extending radially from the thread-bearing periphery of the reel to prevent discharge of the thread or the like over the ends of the reel.

5. A winding reel comprising a first rigid reel member of generally circular cross section adapted to rotate about its longitudinal axis; a second rigid reel member of generally circular cross section adapted to rotate about its longitudinal axis, said reel members having their axes in inclined relation to each other so as to enable them to advance thread or the like lengthwise of the reel in substantially helical turns; and a normally stationary reel-supporting axle provided with two longitudinally adjacent supporting segments, one of said segments supporting said first reel member during rotation thereof and the other of said segments supporting said second reel member during rotation thereof.

6. A winding reel comprising a first rigid reel member of generally circular cross section adapted to rotate about its longitudinal axis; a second rigid reel member of generally circular cross section adapted to rotate about its longitudinal axis, said reel members having their axes in offset and inclined relation so as to enable them to advance thread or the like lengthwise of the reel in substantially helical turns; a normally stationary reel-supporting axle upon which said reel members are mounted for rotation about their respective axes; and, operatively associated with one of said reel members, means for transmitting rotary movement to said reel members.

7. A cantilever winding reel comprising a first reel member of generally circular cross section adapted to rotate about its longitudinal axis; a second reel member of generally circular cross section adapted to rotate about its longitudinal axis, said reel members having their axes in inclined relation to each other so as to enable them to advance thread or the like lengthwise of the reel in substantially helical turns; a cup-shaped bracket adapted to support said reel; and, projecting from the interior of said bracket, a normally stationary axle upon the surface of which said reel members rotate about their respective axes.

8. A cantilever winding reel of the character described in claim 7 wherein means are provided between said bracket and said reel members through which rotary movement may be imparted to said reel members.

9. A cantilever winding reel comprising a first reel member of generally circular cross section adapted to rotate about its longitudinal axis; a second reel member of generally circular cross section adapted to rotate about its longitudinal axis, said reel members having their axes in inclined relation to each other so as to enable them to advance thread or the like lengthwise of the reel in substantially helical turns; and, supported at one end only, a normally stationary axle having a plurality of longitudinally adjacent surfaces on which said reel members rotate, the axes of figure of at least two of said surfaces being in inclined relation to each other.

10. A winding reel comprising a first reel member of generally circular cross section adapted to rotate about its longitudinal axis; a second reel member of generally circular cross section adapted to rotate about its longitudinal axis, said reel members having their axes in inclined relation to each other so as to enable them to advance thread or the like lengthwise of the reel in substantially helical turns; means operatively associated with one of said reel members for positively rotating said reel member; and a freely rotatable axle upon which the other of said reel members is mounted, said last-mentioned reel member and the axle on which it is mounted being rotated by said positively rotated reel member.

11. A winding reel comprising two rotatable reel members of generally circular cross section the periphery of each of which is made up of longitudinally extending bar members, said reel members being adapted to rotate about axes in inclined relation to each other so as to enable them to advance thread or the like lengthwise of the reel in substantially helical turns; a rotatable axle adapted to transmit rotary movement to one of said reel members; means for transmitting rotary movement from such positively driven reel member to the other reel member while maintaining the bar members of said members out of contact; peripheral projections formed integrally with said reel members to prevent the discharge of thread or the like over the ends of the reel; and, associated with said peripheral projections, recesses in each of said reel members into which the bar members of the other reel member extend.

12. A winding reel comprising two rigid reel members of generally circular cross section the periphery of each of which is made up of longitudinally extending bar members, said reel members being adapted to rotate about axes in inclined relation to each other so as to enable them to advance thread or the like lengthwise of the reel in substantially helical turns; means operatively associated with one of said reel members for positively rotating said reel member; means for transmitting rotary movement from said positively rotated reel member to the other reel member while maintaining the bar members of said reel members out of contact; peripheral projections formed integrally with said reel members, said projections serving to prevent the discharge of thread or the like over the ends of the reel; and, associated with said peripheral projections, recesses in said reel members adapted in each case to receive the ends of the bar members of the other reel member.

13. A winding reel comprising two rigid reel members of generally circular cross section the periphery of each of which is made up of longitudinally extending bar members, said reel members being adapted to rotate about axes in inclined relation to each other so as to enable them to advance thread or the like lengthwise of the reel in substantially helical turns; peripheral projections formed integrally with said reel members, said projections serving to prevent the discharge of thread or the like over the ends of the reel; and, associated with said peripheral projections, recesses in said reel members adapted in each case to receive the ends of the bar members of the other reel member.

14. A winding reel comprising a first rigid reel member of generally circular cross section adapted to rotate about its longitudinal axis; a second rigid reel member of generally circular cross section adapted to rotate about its longitudinal axis, said reel members having their axes in inclined relation to each other so as to enable them to advance thread or the like lengthwise of the reel in substantially helical turns; a cup-shaped bracket adapted to support said reel; and, disposed within said cup-shaped bracket, gear means for positively rotating one of said reel members.

GEORGE P. TORRENCE.
RICHARD F. BERGMANN.